Aug. 4, 1942.   G. A. TINNERMAN   2,291,995
HANDLE AND KNOB CONNECTION
Filed April 28, 1941
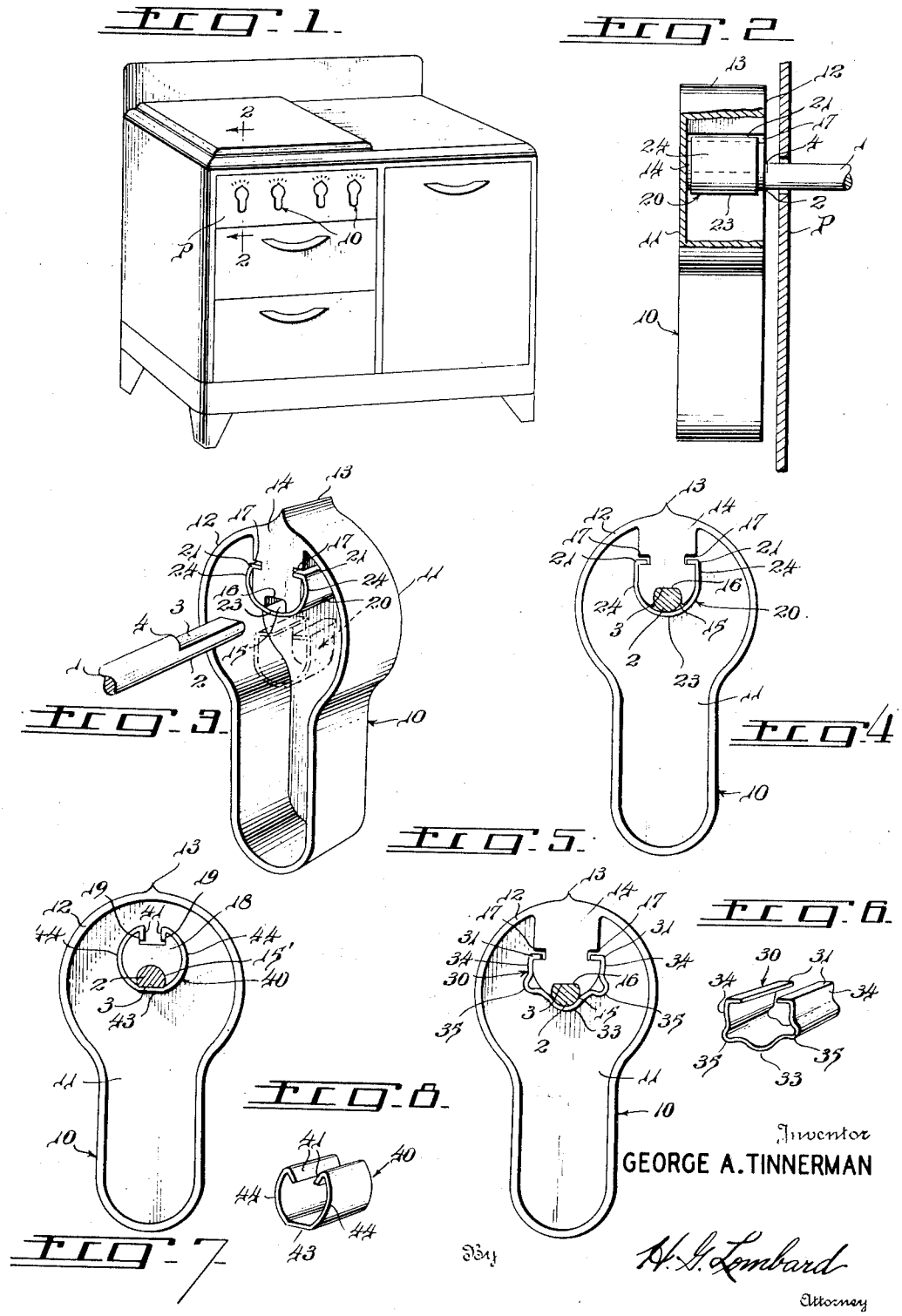
Inventor
GEORGE A. TINNERMAN
H. G. Lombard
Attorney Patented Aug. 4, 1942

2,291,995

UNITED STATES PATENT OFFICE 2,291,995

HANDLE AND KNOB CONNECTION

George A. Tinnerman, Cleveland, Ohio, assignor to Tinnerman Products, Inc., Cleveland, Ohio, a corporation of Ohio Application April 28, 1941, Serial No. 390,824

7 Claims. (Cl. 287—53)

This invention relates to connections for attaching control knobs, handles and similar articles to rotatable shafts, rods, spindles, etc., in order that the same may be manually operated in turning operations and the like without resulting in objectionable looseness, wobble or side play in the connection.

The present application is a continuation in part of copending application Serial Number 238,045 filed October 31, 1938, now Patent No. 2,243,266 issued May 27, 1941.

More particularly, this invention deals with various arrangements for detachably connecting a plastic knob, handle or similar operating member to a shaft or spindle having use, for example, as the adjusting member for a control unit in a radio apparatus, or, for regulating the burner valve in a stove, range construction, or the like. An operating member of this character is usually constructed in a one-piece device of hardened plastic material such as resin, Celluloid, synthetic rubber, etc., suitably formed by well known molding operations to the desired size and shape to include an integral connecting hub having a central bore adapted to receive a reduced end portion or stem of a cooperating shaft or spindle.

In attaching such plastic operating members to shafts and spindles to be held against relative rotative movement or side play, it has been the recent practice to provide in the connecting hub thereof a socket opening having a flat side wall adapted for nonrotatable abutting relation with a flat face of the cooperating shaft assembled therein. It is desirable, of course, that the knob or handle be secured on the shaft against possible axial displacement as well as relative rotative movement and, to this end, various anchoring or retaining means such as set-screws, spring friction and clutch devices, and the like, have been employed.

The plastic composition of the connecting hub on any such plastic parts is relatively fragile and brittle, and when thus provided with a socket opening receiving the shaft together with anchoring means exerting a binding or wedging action between shaft and inner side walls of the socket opening, there frequently occurs a splitting or fracture of the connecting hub in the application of the shaft stem thereto or incident to strain set up in the connection after a period of use with the result that even though the knob, handle or other operating member is not completely broken, it is so loosely fitted to the shaft that it is practically useless and must be replaced any way.

A primary object of the present invention, therefore, is to provide an improved handle or knob connection, or the like, which overcomes the insufficiencies of the prior art structures in the use of a solid, compact form of recessed connecting hub of such size and proportions as to defeat any possibility of splitting or breaking thereof, together with a spring retaining collar fitted thereon and defining a socket opening frictionally and grippingly receiving the shaft under limited expansion of the spring collar, and otherwise providing a connection in which the hub and shaft are positively clamped together against relative rotative as well as relative axial movement.

A further object of the invention is to provide such a knob or handle connection embodying a relatively large, integral connecting hub and a spring collar reinforcing said connecting hub and defining a socket opening having limited expansion in receiving the shaft in frictional, gripping relation therewith, while otherwise providing a connection in which the spring collar compensates for undue strain and excessive side pressure of the shaft during turning operations of the knob or handle to avoid splitting or breaking of the connecting hub.

Another object of the invention comprehends an improved connection for a shaft and operating member or like part, comprising a simple form of connecting hub which may be integrally formed on the operating member at very low cost, and which is so designed for use with a spring retaining collar as to define a socket opening having limited expansion for receiving the shaft under a pronounced, frictional, gripping force in providing a connection which is strong, durable and efficient at all times and not subject to looseness, side play or wobble of any nature.

A more specific object of the invention is for the provision of such a connection for a hardened plastic part and a shaft provided with a reduced end portion or stem having a flat side face adapted for nonrotatable abutting engagement with a flat side wall in a socket opening defined by the connecting hub and a spring collar embracing the same together with means limiting the expansion of the spring collar in effecting a firm, rigid and positive clamped connection of the shaft and connecting hub.

Further objects and advantages, and other new and useful features in the construction, arrangement and general combination of parts of the invention, will be readily apparent to those skilled in the art as the description thereof proceeds with reference to the accompanying drawing, for purposes of illustration but not of limitation, in which like reference characters designate like parts throughout the same, and in which:

Fig. 1 illustrates one application of the improved connection on a stove or range construction provided with knob or handle operating members in accordance with the invention;

Fig. 2 is a sectional view taken on line 2—2 of Fig. 1, looking in the direction of the arrows;

Fig. 3 is a perspective view showing the underside of a knob or handle provided with connecting means in accordance with the invention and illustrating the relation thereof to a shaft stem about to be applied to connected relation therewith;

Fig. 4 shows the underside of the knob or handle in elevation with the shaft, represented in section, in connected relation therewith;

Fig. 5 is a view similar to Fig. 4 showing the connection provided by another form of spring collar;

Fig. 6 is a perspective of the spring collar shown employed in Fig. 5;

Fig. 7 is a view similar to Fig. 4 showing the connection provided by a further form of spring collar; and, Fig. 8 is a perspective view of the spring collar embodied in the connection of Fig. 7.

Connections in accordance with the present invention are of general utility and are especially useful and advantageous in providing a simple and inexpensive connecting means which may be easily embodied in any installation wherein a knob, handle or other article of manufacture is to be detachably secured to a shaft, rod, spindle, or the like. Generally speaking, the invention contemplates various forms of a connection in which a knob or handle is provided with a relatively large, solid, compact connecting hub of such size and proportions as to ensure any required strength against splitting or breaking either in the initial assembly thereof with a cooperating shaft, or incidental to strain set up in the connection after a period of use in an installation. The connecting hub preferably is integrally formed on the plastic knob, handle, or the like, provided as a simple, one-piece article of manufacture and this, of course, greatly facilitates the quantity production of a high grade article at minimum cost inasmuch as only the simplest molding equipment is required.

In addition, the instant connecting arrangement requires only the use of a simple, inexpensive, spring retaining collar which is entirely concealed from view in a completed installation and otherwise eliminates expensive and time consuming drilling, tapping and broaching operations heretofore necessary in producing such articles, besides dispensing with the use of set screws and special forms of spring friction and clutch devices for exerting a binding or wedging action on the shaft to prevent displacement of the connection. In this respect, it will be recognized that the improved spring collar connection of the present invention involves a decided advantage over heretofore known connections in that the spring collar is designed for only limited expansion in clamping the connecting hub and shaft directly together under a pronounced spring force, and thus not only reinforces and bolsters the fragile plastic material of the connecting hub, but also serves to compensate for possible excessive side pressure of the shaft in turning movements and other operations which otherwise would cause a fracture or breaking of said connecting hub.

While the invention is disclosed with reference to a knob, handle or similar operating member such as employed for regulating valves or adjusting tuning units of radio apparatus, for example, the invention is not limited to such applications and may be designed for a wide range and variety of other uses as the means for connecting, mounting or securing many other articles of manufacture to shafts, rods, spindles, and the like, for purposes of transmitting or receiving a relatively small torque or other force.

As an example, Fig. 1 shows one application of the invention as employed for connecting handles 10, or the like, to the shafts leading to the valves of the gas burner units in a stove or range construction. As best seen in Fig. 2, such a valve has a shaft member 1 which extends through an opening in the outer manifold panel P, and which usually is of generally round cross-section and provided with a cutaway or reduced portion on the leading end thereof to define a substantially D-shaped stem 2 having a flat side face 3 terminating in a shoulder 4, if desired. The shaft stem may be of any necessary or desired cross-section such as round, D-shaped, triangular, rectangular or other irregular, flat-sided or poly-sided configuration, in which relation the socket opening provided in the connecting hub of the handle is suitably designed of corresponding shape to provide an even, precise fit for the shaft stem when assembled therewith, as presently to be described.

The handle, knob or the like operating member, designated generally 10, is formed of any suitable material, preferably a plastic composition molded into a compact, one-piece device of any selected size or shape. The handle shown includes a substantially annular portion merging into a lever portion, the same being generally cup-shaped in section and defining an imperforate outer body 11 together with a peripheral flange 12 on which may be formed suitable indicating means such as dial graduations or a pointer 13, or the like.

Within the annular portion of the handle there is provided a connecting hub 14 which, in the case of a plastic molded part, is an integral formation that may be readily provided for in the molding of the handle itself at very little added cost. Said hub 14, may assume any selected size or shape, and, if desired, may be provided in the form of an integral projection comprising the center area of a plastic part molded solid throughout. As best seen in Figs. 3 and 4, the connecting hub preferably is provided in the manner of a relatively large projection extending generally normal to the imperforate body 11 and integrally formed with a portion of the peripheral flange 12 such that these elements mutually reinforce and support each other.

An important advantage resides in the fact that a knob or handle having a connecting hub of this character requires only the simplest type of molding equipment in that said connecting hub may be formed as a solid, substantial projection in a handle, or the like, which is otherwise more or less hollow throughout such that in quantity production, a considerable saving is obtained in the amount of material required. At the same time, the connecting hub may be readily formed in an enlarged size as compared to the cross-section of the cooperating shaft to be of such strength and durability as to eliminate any possibility of splitting, cracking or breaking from its foundation under strain taking place in the application of the shaft thereto or after a period of use in an installation. In this respect, it will be understood that the connecting hub arrangement of the present invention eliminates entirely the necessity for strengthening ribs, webs, inserts and similar reinforcing means heretofore found necessary in the design of the connecting means for such handles, knobs and similar articles of manufacture.

The connecting hub thus provided on the handle, or the like, defines a substantially semi-circular configuration at its outer shaft bearing surface which includes an axially extending recess 15 of a width approximating the diameter of the cooperating shaft stem 2 to be received therein and otherwise suitably designed in accordance with shape of such stem to snugly receive the same. In the form of the invention shown in Figs. 3 and 4, said recess 15 is shown provided as a simple, generally rectangular cavity including a flat side wall 16 against which the flat side face 3 of the cooperating D-shaped stem is adapted to seat in rigid, nonrotatable, abutting engagement therewith. On the sides of the connecting hub, oppositely disposed grooves 17 are provided for receiving the extremities of the spring collar applied to embracing relation with the connecting hub, substantially as shown in Fig. 3.

The spring collar 20, or similar fastener, is constructed of any suitable material, preferably spring metal such as spring steel, or cold rolled metal having spring-like characteristics. In the embodiment of Figs. 3 and 4, the spring collar is provided from a strip of sheet metal formed into a generally U-shaped configuration and having the extremities thereof bent inwardly toward each other to define lips, tongues or similar retaining elements 21 receivable in the grooves 17 of the connecting hub. The spring collar otherwise is so designed that the bight or base portion 23 between the arms 24 of the U-shape is disposed opposite the recess 15 in the connecting hub in the assembled relation of the spring collar therewith. As illustrated by the dotted line showing in Fig. 3, the spring collar may be easily and quickly applied over the outer shaft bearing surface of the connecting hub 14 simply by spreading the arms 24 thereof as necessary to admit the connecting hub therebetween to a position in which the inwardly bent extremities 21 thereof are received in the grooves 17 by substantial snap fastening action.

The spring collar thus assembled, is held in self-retained position on the connecting hub by the resiliency of the spring arms 24 and, in this relation, said arms preferably are slightly bowed in spaced relation to the adjacent sides of the connecting hub to allow for suitable clearance when the spring collar is tensioned in the application of the shaft stem to complete the connection. The socket opening receiving the shaft stem 2 thus is defined by the axial recess 15 in the connecting hub and the base portion 23 of the spring collar and such socket opening is of a size slightly smaller than the cross-section of the shaft stem 2 such that a friction, press fit is ensured.

The shaft itself is usually plain round rod material but, of course, may be of any other selected stock so long as it is provided with a stem, preferably of substantial D-shape, capable of being snugly received in the socket opening defined by the connecting hub recess 15 and the spring collar, as aforesaid. Naturally, round stock is the most desirable since it is the cheapest and requires only a simple, expeditious cutting or grinding operation along one side to provide the cutaway portion forming the desired, substantially D-shaped shaft stem 2 having the flat face 3 and a shoulder 4 spaced from the extremity of the shaft stem a distance approximating the depth of the recess 15 in the connecting hub.

In any event, the shaft stem 2 is readily introduced into the socket opening, Fig. 3, defined by the recess 15 in the connecting hub and the adjacent base portion 23 of the spring collar with the flat face 3 of said stem in juxtaposed relation to the flat side wall 16 of said recess and otherwise disposed in snug, rigid, frictional engagement in said socket opening as shown in Fig. 4. To facilitate such application, the shaft stem may be provided with a tapered extremity whereupon it may be easily and quickly slipped into the socket opening and advanced axially therein to fully assembled position, with the shoulder 4 thereon in abutting relation with the adjacent end face of the connecting hub substantially as shown in Fig. 2, in which relation the rigidity of the connection is materially enhanced.

In the application of the shaft stem to the socket opening defined by the spring collar and the recess 15 in the connecting hub as shown in Fig. 3, the base portion 23 of the spring collar will be forced outwardly as necessary to admit the shaft, this distending the slightly bowed spring arms 24 from the position of Fig. 3 into snug bearing engagement with the adjacent sides of the connecting hub as shown in Fig. 4. Such expansion of the spring collar in assembled relation with the connecting hub is limited by the inturned tongues, lips or similar retaining elements 21 engaging the adjacent walls or shoulders of the grooves 17 to cause the shaft engaging portion 24 of the spring collar to exert a pronounced compressive force on the shaft maintaining the same in firm, rigid clamped engagement against the connecting hub with the flat face 3 of the stem in nonrotative abutting relation with the flat side wall 16 of the axial recess therein. The arrangement otherwise is such that the spring collar serves to bolster the relatively fragile, plastic material of the connecting hub surrounding the shaft to reinforce the same against possible splitting or breaking as a result of strain or side pressure set up in the connection during turning movements and other operations of the knob or handle. Thus, the respective parts of the connection are securely held against relative rotative as well as relative axial movement at all times and the major portion of any thrust, strain or side pressure exerted by the shaft is compensated for by the resiliency of the spring collar instead of being transmitted to the connecting hub, wherefore there is little possibility of chipping or cracking the plastic material thereof or otherwise causing splitting or breaking of the connecting hub from its foundation on the body 11 of the knob, handle or other article of manufacture.

Figs. 5 and 6 show another embodiment of the invention which is similar in structure, operation and use to that described with reference to Figs. 1–4 inclusive. In some applications it is advantageous to have the shaft stem seated in the axial recess in the connecting hub but projecting outwardly thereof in order that the spring collar may engage the same over a greater portion of its periphery under an increased binding or gripping action. The spring collar 30, accordingly, is provided as shown in Fig. 6 with the extremities thereof bent inwardly to define lips, tongues or similar retaining elements 31 receivable in the grooves 17 of the connecting hub, while the shaft engaging section 33 thereon is formed into a substantial corrugation corresponding to the contour of the engaged portion of the shaft. The arms 34 of the spring collar include resilient folds 35 providing for a slightly greater expansion of the spring collar when the shaft is forced into the socket opening defined by the corrugation 33 and the axial recess 15 in the connecting hub. Expansion of the spring collar is limited by the lips or tongues 31 in engagement with the adjacent walls or shoulders defined by the grooves 17 in the connecting hub, as described with reference to Figs. 1–4 inclusive, such that the shaft engaging corrugation 33 firmly and rigidly bears upon the projecting peripheral portion of the shaft stem in a pronounced compressive force and positively clamps the same against the connecting hub with the flat side face 3 of said shaft stem in fixed, non-rotatable abutting relation with the flat side wall 16 of the axial recess, substantially as shown in Fig. 5.

Figs. 7 and 8 illustrate another embodiment similar in application and use to the general connecting hub and spring collar construction of the previously described forms of the invention. The connecting hub in this instance is provided as a strong, compact stud or post element 18, preferably integrally molded with the knob or handle body 11. The axial shaft receiving recess may be provided to seat the shaft either as in Figs. 4 and 5 or in the manner of a substantially semicircular shaft bearing surface 15' receiving the generally round portion of the shaft stem with the flat face 3 thereof extending outwardly to one side of the connecting hub, while at the opposite side of said connecting hub, a groove is provided defining spaced shoulders 19. The spring collar 40, is constructed substantially as shown in Fig. 8 with the extremities thereof bent inwardly to define the lips, tongues or similar retaining elements 41 while the central, shaft engaging section 43 between the arms 44 is preferably flat or only slightly bowed. As may be understood from Fig. 7, the spring collar 40 is easily and quickly assembled onto the connecting hub 18 and held in self-retaining position thereon by the tongues or lips 41 thereof in resilient engagement with the shoulders 19. The axial recess 15' in the connecting hub and the substantially flat shaft engaging section 43 of the spring collar thus define a substantially D-shaped socket opening for receiving the correspondingly shaped D-shaped shaft stem 2 with the flat face 3 thereof in rigid, nonrotatable abutting relation with said substantially flat shaft engaging section 43 of the spring collar. When the shaft stem is inserted into socket opening thus provided, the spring collar is expanded as necessary to admit the same, with such expansion being limited by the lips or tongues 41 in engagement with the shoulders 19, in a manner similar to the previously described forms of the invention. However, considerable added strength is inherent in this form of the connection by reason of the firm, rigid, nonrotatable abutting relation of the flat side face 3 of the shaft stem with the flat side wall defined by the substantially flat shaft engaging section 43 of the spring collar, such that practically the entire thrust and side pressure taking place in the connection on turning operations and the like of the knob or handle is compensated for by the resilient spring collar, and no undue stress or strain is transmitted to the relatively fragile connecting hub 18 which might possibly cause chipping, cracking or breaking thereof. To this end, in the embodiments of Figs. 2–4 inclusive or Figs. 5 and 6, the socket opening similarly may be so designed as to seat the shaft stem with the flat face 3 extending outwardly and engaged directly by a correspondingly shaped shaft engaging section of the spring collar.

The connecting means of the instant invention, in any embodiment, provided a most simple, inexpensive construction making for a highly practical arrangement by which a knob, handle or other article of manufacture may be easily and quickly attached to a shaft through the medium of a spring collar device gripping both the shaft and connecting hub to hold the same in a firm, rigid, clamped engagement under continuously effective spring tension against relative rotative as well as relative axial movement. As respects relative axial movement, even greater efficiency and a substantially positive locked connection may be obtained simply by providing coengaging teeth, ribs, knurling, etc., on adjacent cooperating surfaces of the shaft stem and connecting hub recess in any embodiment of the invention.

It will be appreciated, also, that the improved connections of the present invention are such as to be especially suited for use with articles formed of plastic compositions and other fragile materials inasmuch as the spring collar device employed in any embodiment is so designed as to reinforce the material of the connecting hub and otherwise bolster the same in firm, positive clamped engagement with the shaft stem at all times, and thereby practically eliminate any possibility of splitting or breaking of the connecting hub incident to strain taking place in the connection when employed either as a rotary panel knob or push-pull handle device.

Though the description and drawings refer to the invention as incorporated in a panel knob or handle, it will be understood that the instant connecting means is equally applicable wherever any article of manufacture is to be secured to a shaft, rod, spindle, etc., or in any installation in which an operating member is to be mounted by sliding the same over the end of a shaft or applied to a shaft stem to effect axial movements thereto, or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a connection, a part including a connecting hub having an outer surface provided with an axial recess and being grooved to define shoulders spaced from said axial recess, a cooperating part comprising a shaft seated in said axial recess, and a spring collar defining a sleeve on said connecting hub comprising a strip of sheet metal having a shaft engaging section and inwardly bent extremities defining retaining elements engaging said shoulders, said shaft engaging section of the spring collar and said axial recess on the connecting hub cooperating to define a socket opening frictionally and grippingly receiving said shaft.

2. In a connection, a part including a connecting hub having an outer surface provided with an axial recess and being grooved to define shoulders spaced from said axial recess, a cooperating part comprising a shaft seated in said axial recess and having a flat side face, and a spring collar defining a sleeve on said connecting hub comprising a strip of sheet metal having a shaft engaging section and inwardly bent extremities defining retaining elements engaging said shoulders on the connecting hub, said shaft engaging section of the spring collar and the axial recess on the connecting hub cooperating to define a socket opening having a flat side wall, said socket opening frictionally and grippingly receiving said shaft with the flat side wall thereof in nonrotatable abutting engagement with said flat side face of the shaft.

3. In a connection, a part including a connecting hub having an outer surface provided with an axial recess and being grooved to define shoulders spaced from said axial recess, a cooperating part comprising a shaft seated in said axial recess and having a flat side face, and a spring collar defining a sleeve on said connecting hub comprising a strip of sheet metal having a substantially flat shaft engaging section and inwardly bent extremities providing retaining elements engaging said shoulders on the connecting hub, said flat shaft engaging section of the spring collar and the axial recess on said outer surface of the hub cooperating to define a socket opening having a flat side wall, said socket opening receiving said shaft in frictional gripping relation therewith with said flat side face of the shaft abutting the flat side wall defined by said substantially flat shaft engaging section of the spring collar.

4. In a connection, a part comprising a connecting hub having an outer surface provided with an axial recess including a flat side wall, said part being grooved to define shoulders spaced from said axial recess, a cooperating part comprising a shaft provided with a flat side face, and a spring collar defining a sleeve on said connecting hub comprising a strip of metal bent to form a shaft engaging section and retaining elements engaging said shoulders, said shaft engaging section of the spring collar and said axial recess on the connecting hub cooperating to define a socket opening frictionally and grippingly receiving said shaft with the flat face of said shaft in nonrotatable abutting engagement with the flat side wall of said axial recess in the connecting hub.

5. In a connection, a part including a connecting hub provided with an axial recess and being grooved to define shoulders spaced from said axial recess, a cooperating part comprising a shaft seated in said axial recess, and a spring collar fitted onto said connecting hub comprising a strip of metal bent to form a shaft engaging corrugation, an expansible fold on either side of said corrugation and retaining elements engaging said shoulders on the connecting hub, said shaft engaging corrugation of the spring collar and said axial recess in the connecting hub cooperating to define a socket opening frictionally and grippingly receiving said shaft.

6. In a connection, a part including a connecting hub provided with an axial recess and being grooved to define shoulders spaced from said axial recess, a cooperating part comprising a shaft seated in said axial recess and having a flat side face, and a spring collar fitted onto said connecting hub comprising a strip of sheet metal having a shaft engaging corrugation, an expansible fold on either side of said corrugation and inwardly bent extremities defining retaining elements engaging said shoulders on the connecting hub, said shaft engaging corrugation of the spring collar and said axial recess in the connecting hub cooperating to define a socket opening having a flat side wall, said socket opening frictionally and grippingly receiving said shaft with the flat side face thereof in nonrotatable abutting engagement with said flat side wall of the socket opening.

7. In a connection of the class described, the combination with a flattened shaft of a handle member having a hub with an exposed exterior and a recess in such exterior, and a split spring sleeve embracing the hub, extending across the said recess and having turned ends adapted to engage shoulders provided by grooving of the handle member, the sleeve and recess providing a flattened socket adapted to receive the flattened shaft.

GEORGE A. TINNERMAN.